United States Patent
Tajima

(10) Patent No.: US 6,512,563 B1
(45) Date of Patent: Jan. 28, 2003

(54) METHOD FOR PRODUCING ULTRAHIGH RESOLUTION OPTICAL DEVICE PANEL

(75) Inventor: Eiichi Tajima, Iruma (JP)

(73) Assignee: Citizen Watch Co., Ltd., Nishitokyo (JP)

( * ) Notice: Subject to any disclaimer, the term of this patent is extended or adjusted under 35 U.S.C. 154(b) by 56 days.

(21) Appl. No.: 09/831,895
(22) PCT Filed: Sep. 27, 2000
(86) PCT No.: PCT/JP00/06674

§ 371 (c)(1),
(2), (4) Date: May 24, 2001

(87) PCT Pub. No.: WO01/23950

PCT Pub. Date: Apr. 5, 2001

(30) Foreign Application Priority Data

Sep. 27, 1999 (JP) .......................................... 11-272612

(51) Int. Cl.[7] ............................................... G02F 1/03
(52) U.S. Cl. ..................... 349/123; 349/200; 349/187; 359/254
(58) Field of Search ................................ 349/200, 187, 349/123, 69; 359/254

(56) References Cited

U.S. PATENT DOCUMENTS 5,150,234 A * 9/1992 Takahashi et al. ............ 359/65
5,825,448 A * 10/1998 Bos et al. .................... 349/128
6,191,881 B1 2/2001 Tajima

FOREIGN PATENT DOCUMENTS

| JP | 56-47021 | 4/1981 |
| JP | 3-2840 | 1/1991 |
| JP | 3-9327 | 1/1991 |
| JP | 4-240817 | 8/1992 |
| JP | 9-197363 | 7/1997 |

* cited by examiner

Primary Examiner—Toan Ton
Assistant Examiner—Hoan Nguyen
(74) Attorney, Agent, or Firm—Armstrong, Westerman & Hattori, LLP

(57) ABSTRACT

A super-resolution optical panel is fabricated such that a first circular transparent electrode (13) is installed in the central region of a first substrate (11), an alignment layer is formed on the first circular transparent electrode (13), an alignment treatment is applied in the direction of the arrow A to the alignment layer, a second circular transparent electrode (16) is installed on a second substrate (12), an alignment layer is formed on the second circular transparent electrode (16), an alignment treatment is applied in a direction of an arrow B parallel with and opposite to a direction of an arrow A to the entire surface of the alignment layer, the alignment layer except a circular region at the center thereof is subsequently covered with a resist, an alignment treatment is applied in a direction of an arrow C orthogonal to the direction of the arrow B only to the circular region at the center, the resist is subsequently removed, and twisted nematic liquid crystal is filled between the first substrate (11) and the second substrate (12), thereby forming a twisted alignment region (21) and a parallel alignment region (22).

9 Claims, 18 Drawing Sheets

METHOD FOR PRODUCING ULTRAHIGH RESOLUTION OPTICAL DEVICE PANEL

TECHNICAL FIELD

The present invention relates to a method of fabricating a super-resolution optical panel applicable to an optical disc player and the like, and particularly, to a method of fabricating a super-resolution optical panel having a high optical utilization ratio and capable of electrically changing over a numerical aperture with ease, suitable for implementation of an optical pickup for common use in DVDs (digital versatile discs) and CDs (compact discs).

BACKGROUND TECHNOLOGY

There has already been developed a liquid crystal lens capable of varying a focal length by an applied voltage as disclosed in, for example, JP, 4-240817, A.

As shown in FIG. 40, a variable focal length liquid crystal lens disclosed in this publication has a construction wherein 320×220 pixels are arranged in a lattice shape by use of transparent electrodes in a display area 102 which is recorded as a phase type Fresnel zone plate 101 of a liquid crystal space optical modulator 100, and liquid crystal of an ECB (electrically controlled birefringence) mode is sealed in the display area 102.

The liquid crystal space optical modulator 100 has a light wave modulation characteristic such that laser beams undergo continuous phase modulation in a range of 0 to $2\pi$ when a voltage is applied to the transparent electrodes.

At the time of such phase modulation, by applying a voltage signal Vs that affects every pixel with phase modulation corresponding to the spatial coordinates thereof, laser beams 103 incident on the liquid crystal space optical modulator 100 undergo phase modulation by every pixel, and are concentrated at a focal point Fa on the optical axis as shown in FIG. 41.

Further, if a different voltage signal Vs is applied thereto, the light concentrating position of the laser beams 103 can be moved to a point Fb on the optical axis.

However, the publication described above discloses merely a theoretical configuration, and in the embodiments described therein, no description on a shape, construction, material, and so forth of the liquid crystal space optical modulator has been given in concrete terms, so that the invention cited has not been practicable.

Also, a liquid crystal lens is disclosed in JP, 3-2840, A. Referring to FIG. 42, the liquid crystal lens is briefly described hereinafter. The liquid crystal lens comprises a liquid crystal, a control electrode for applying a voltage to the liquid crystal, and a fixed electrode, and as shown in FIG. 42, the control electrode 105 is comprised of transparent electrode bands 106 in a circular and concentric ring-like shape, and insulating bands 107 for insulating the respective transparent electrode bands 106 from each other. The respective transparent electrode bands 106 are independently wired.

When a voltage is applied to the transparent electrode bands 106, the polarization plane of incident light is rotated through 90 degrees in areas where the transparent electrode bands 106 exist during a period when the incident light passes through a liquid crystal layer while the incident light is permitted to pass therethrough as it is in other areas.

Accordingly, light beams outgoing from the liquid crystal lens form images at an identical point independently without interfering with each other, and the focal point length of the liquid crystal lens is varied by a voltage applied to the transparent electrode bands 106.

However, description on a shape, material, and so forth, thereof is not set forth in practicable and concrete terms in this publication, and a method of fabricating the same is not available therein either, so that the invention cited has not so far been practiced.

Further, it has been theoretically shown that a super-resolution optical panel can be obtained by making use of a liquid crystal panel, and by differentiating the alignment direction of a portion of a light transmitting region thereof from that of other regions thereof. However, the super-resolution optical panel has not so far been put to commercial use, because the super-resolution optical panel has been unable to be fabricated at a high yield and at a low cost.

It is therefore an object of the invention to overcome the problems described above, and to provide a method of fabricating a super-resolution optical panel capable of varying intensity of laser beams with ease at a high yield and low cost.

DISCLOSURE OF THE INVENTION

To this end, a method of fabricating a super-resolution optical panel according to the present invention comprises:

a step of preparing a first substrate and a second substrate, both of which are transparent;

a step of forming a first circular transparent electrode on the first substrate;

a step of forming a second circular transparent electrode larger than the first circular transparent electrode on the second substrate;

a step of forming an alignment layer in a region covering at least the first circular transparent electrode on the first substrate, and in a region covering at least the second circular transparent electrode on the second substrate, respectively;

a step of applying an alignment treatment in a first direction to the respective alignment layers by use of a rubbing roll such that pre-tilt faces of the respective alignment layers are in parallel with each other when the first circular transparent electrode is opposed to the second circular transparent electrode;

a step of forming a resist patterned in a doughnut-like shape provided with an opening in a circular shape at the center thereof on the alignment layer of the second substrate with a rubbing treatment applied thereto;

a step of applying an alignment treatment in a second direction orthogonal to the first direction to a portion of the alignment layer exposed inside the opening of the resist by use of a rubbing roll;

a step of subsequently peeling off the resist from the upper face of the second substrate;

a step of forming a sealing member on the first substrate so as to encircle the first circular transparent electrode;

a step of scattering gap members in a region encircled by the sealing member on the first substrate;

a step of bonding the first substrate with the second substrate so as to overlap each other with the gap members interposed therebetween by opposing the first circular transparent electrode to the second circular transparent electrode such that respective centers thereof coincide with each other, and the respective first directions in which the alignment treatment is applied to the respective alignment layers coincide with each other; and a step of filling twisted nematic liquid crystal in a spacing encircled by the sealing member, and between the first substrate and the second substrate.

In accordance with a first aspect of the invention, it is preferable that, in the step of forming the first circular transparent electrode on the first substrate, a first take-out electrode for connecting the first circular transparent electrode to an external terminal, and an isolated second take-out electrode are formed on the first substrate, in the step of forming the second circular transparent electrode on the second substrate, a third take-out electrode for connecting the second circular transparent electrode to the second take-out electrode is formed on the second substrate, and the method of fabricating the super-resolution optical panel further comprising a step of installing an electrically conductive adhesive on the third take-out electrode formed on the second substrate, subsequently to the step of scattering gap members, wherein the second take-out electrode and the third take-out electrode are connected with each other by the electrically conductive adhesive in the step of bonding the first substrate with the second substrate so as to overlap each other.

Or the invention may be modified such that, in the step of forming the first circular transparent electrode on the first substrate, a first take-out electrode for connecting the first circular transparent electrode to an external terminal, and an isolated second take-out electrode are formed on the first substrate, in the step of forming the second circular transparent electrode on the second substrate, a third take-out electrode for connecting the second circular transparent electrode to the second take-out electrode is formed on the second substrate, in the step of forming the sealing member on the first substrate, an anisotropic electrically conductive sealing member is formed so as to encircle the first circular transparent electrode and pass on the second take-out electrode, and in the step of bonding the first substrate with the second substrate so as to overlap each other, the second take-out electrode and the third take-out electrode are connected with each other by the anisotropic electrically conductive sealing member.

Further, with these features, in the step of forming the first circular transparent electrode on the first substrate, a central circular transparent electrode in a small circular shape and a ring-like transparent electrode provided with a gap interposed therebetween may be formed on the first substrate in place of the first circular transparent electrode.

Further, a fourth take-out electrode and a first take-out electrode for connecting the central circular transparent electrode in the small circular shape and the ring-like transparent electrode to external terminals, respectively, together with an isolated second take-out electrode are preferably formed.

Furthermore, with the method of fabricating the respective super-resolution optical panels described above, the step of forming the resist, patterned in the doughnut-like shape provided with the opening in the circular shape at the center thereof on the alignment layer of the second substrate with the rubbing treatment applied thereto preferably comprises steps of:

applying a positive photosensitive resist onto the alignment layer of the second substrate with the rubbing treatment applied thereto;

subjecting the positive photosensitive resist to exposure by use of a photo mask having a through-hole in a circular shape at the center thereof;

subsequently developing the positive photosensitive resist by immersing the second substrate in a developing solution and dissolving a circular portion at the center of the positive photosensitive resist exposed to light, and forming a resist patterned in a doughnut-like shape by baking and curing a remaining portion of the positive photosensitive resist in a doughnut-like shape.

In the case of fabricating a multiple pieces of the super-resolution optical panels at a time with the use of a pair of the first substrate and the second substrate, both being transparent, in accordance with any one of the methods of fabricating the respective super-resolution optical panel as described above, it is preferable that in the step of forming the sealing member on the first substrate so as to encircle the first circular transparent electrode, a first sealing member having a filling hole is formed in such a way as to encircle the first circular transparent electrode of the individual super-resolution optical panels, and a second sealing member having a filling hole is formed in such a way as to enclose an entire region where all the super-resolution optical panels are formed, in the step of filling the twisted nematic liquid crystal in the spacing encircled by the sealing member, and between the first substrate and the second substrate, the twisted nematic liquid crystal is filled into the spacing encircled by the respective first sealing members of all the super-resolution optical panels through the filling hole of the respective first sealing members by filling the twisted nematic liquid crystal through the filling hole of the second sealing member, and subsequently, the first substrate and the second substrate are cut into a size of the individual super-resolution optical panels, respectively, and the filling hole of the first sealing member of the respective super-resolution optical panels as cut are closed with an adhesive.

Operation

With the super-resolution optical panel fabricated by the method according to the invention, high performance variation in intensity of light power at a focused spot can be effected by the agency of the central circular transparent electrode installed on the first substrate, and the ring-like transparent electrode concentrically installed on the outside of the central circular transparent electrode.

Further, with the method of fabricating the super-resolution optical panel according to the invention, a twisted alignment treatment is applied on the central circular transparent electrode, and a parallel alignment treatment is applied on the ring-like transparent electrode concentrically installed on the outside of the central circular transparent electrode, so that it becomes possible to vary intensity of transmitting laser light at a focused spot such that it is reduced when no voltage is applied while it is increased when a voltage is applied.

Also, as a step of printing on one side with silver paste can be eliminated as a result of mixing electrically conductive particles in the sealing member, fabrication steps can be simplified, resulting in reduction of a fabrication cost.

BEST MODE FOR CARRYING OUT THE INVENTION

Embodiments of a method of fabricating a super-resolution optical panel according to the invention are described in detail and in concrete terms hereinafter with reference to the accompanying drawings.
Construction Example of a Super-resolution Optical Panel: FIGS. 1 to 7

First, a construction of a super-resolution optical panel fabricated by the method of fabricating the same according to the invention is described with reference to FIGS. 1 to 7.

Figure 1:
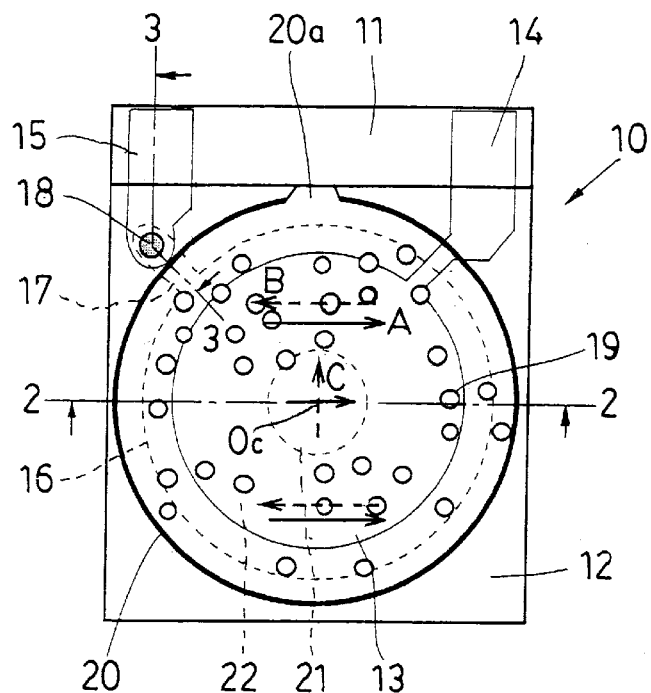
FIG. 1 is a plan view of a basic example of a super-resolution optical panel fabricated by an embodiment of a method of fabricating a super-resolution optical panel according to the invention, as seen from the side of a second substrate thereof.
Figure 2:
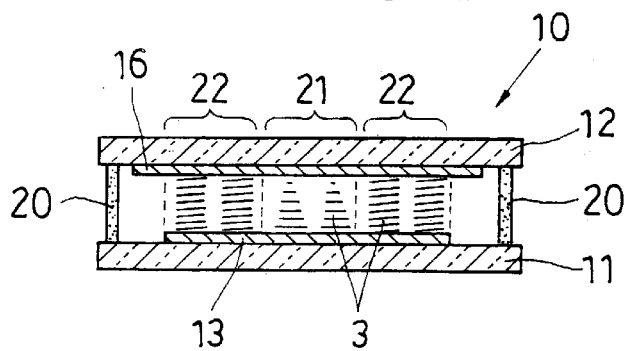
FIG. 2 is a sectional view taken along line 2—2 of FIG. 1.
Figure 3:
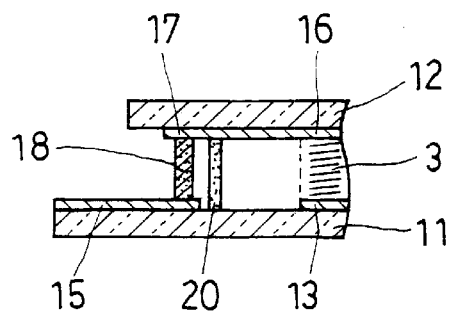
FIG. 3 is a partial sectional view taken along line 3—3 of FIG. 1.

FIG. 1 is a plan view of a first construction example of the super-resolution optical panel as seen from the side of a second substrate from which laser beams outgoes, FIG. 2 a schematic sectional view thereof, taken along line 2—2 of FIG. 1, and FIG. 3 a partial sectional view thereof, taken along line 3—3 of FIG. 1. In the respective sectional views, considerably enlarged dimensions thicknesswise are shown, omitting gap members in illustration.

The super-resolution optical panel 10 comprises a first substrate 11 and a second substrate 12, made up of a transparent glass sheet, respectively, which are disposed in parallel with, and opposite to each other, as clearly shown in FIG. 2. In FIG. 1, the second substrate 12 is shown in the foreground, and the first substrate 11 is disposed on the rear side thereof.

On the inner surface of the first substrate 11, there are disposed a first circular transparent electrode 13 centering round the optical center Oc, a first take-out electrode 14 continuous from the first circular transparent electrode 13 for connecting the first circular transparent electrode 13 to an external terminal, an isolated second take-out electrode 15, all of which are formed of a transparent and electrically conductive film such as an indium tin oxide (referred to as "ITO" hereinafter) film, and so forth, respectively. As shown in FIG. 1, the first take-out electrode 14 and the second take-out electrode 15 are disposed at the opposite edges of a portion of the first substrate 11 rectangular in shape, protruding out of the second substrate 12.

Meanwhile, on the inner surface of the second substrate 12 as well, there are disposed a second circular transparent electrode 16 (indicated by a broken line in FIG. 1) concentrical with and larger in circumference than the first circular transparent electrode 13, and a third take-out electrode 17 continuous from the second circular transparent electrode 16 for connecting the second circular transparent electrode 16 to the second take-out electrode 15, both of which are formed of a transparent and electrically conductive film such as an ITO film, and so forth, respectively.

The first substrate 11 and the second substrate 12 are bonded with each other by a sealing member 20 installed so as to form a circular shape encircling the outside of the first circular transparent electrode 13. A multitude of gap members 19 composed of plastic beads or silica beads are scattered inside a region encircled by the sealing member 20, thereby keeping a spacing between the first substrate 11 and the second substrate 12 at a specified value.

An alignment layer (not shown) with an alignment treatment applied thereto is formed on the first circular transparent electrode 13 and the second circular transparent electrode 16, respectively. The entire surface of the alignment layer formed on the first circular transparent electrode 13 is aligned in the direction of the arrow A indicated by the solid line. As for the surface of the alignment layer formed on the second circular transparent electrode 16, a ring-like region thereof excluding a small circular region around the center thereof is aligned in a direction parallel with, and opposite to an alignment direction of the alignment layer formed on the first circular transparent electrode 13, as shown by the arrow B indicated by the broken line, and the surface thereof in the small circular region around the center is aligned in the direction of the arrow C indicated by the broken line, orthogonal to the direction of the arrow B indicated by the broken line.

Twisted nematic liquid crystal 3 filled through a filling hole 20=aof the sealing member 20 is sealed in-between a gap enclosed by the first substrate 11, the second substrate 12, and the sealing member 20, and as schematically shown in FIG. 2, there are provided a twisted alignment region 21 circular in shape centering round the optical center Oc and disposed at the central part thereof, and a parallel alignment region 22 in a ring-like shape disposed around the twisted alignment region 21.

Further, the second take-out electrode 15 and the third take-out electrode 17 are formed so as to overlap a part of each other as seen in a plan view, and overlapping parts thereof are connected with each other by an electrically conductive adhesive 18, so that the second circular transparent electrode 16 formed on the second substrate 12 is connected to the second take-out electrode 15 formed on the first substrate 11 for further connection with an external terminal.

Figure 4:
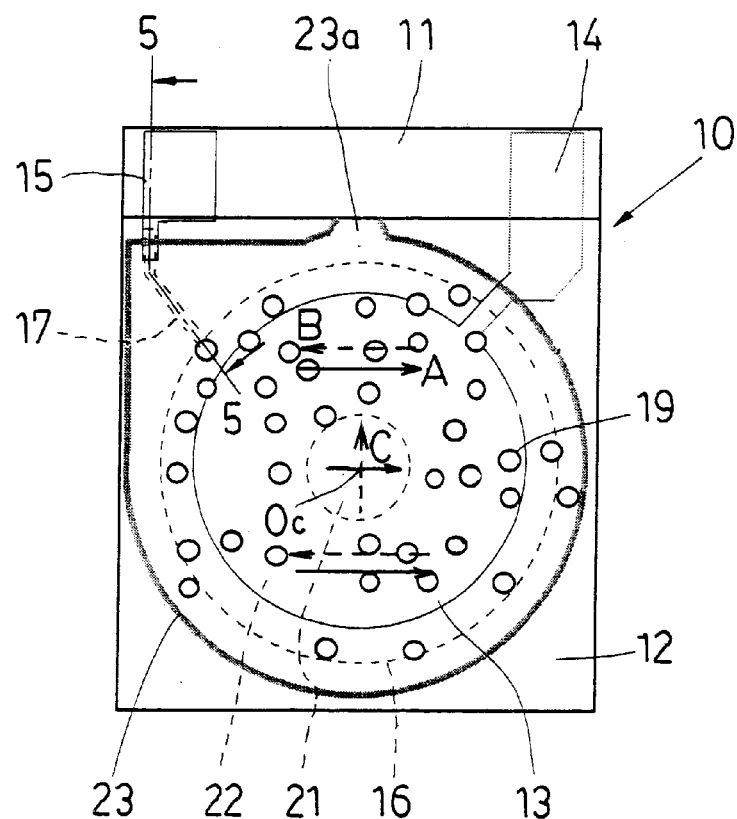
FIG. 4 is a plan view of another example of a super-resolution optical panel fabricated by another embodiment of a method of fabricating a super-resolution optical panel according to the invention, as seen from the side of a second substrate thereof.
Figure 5:
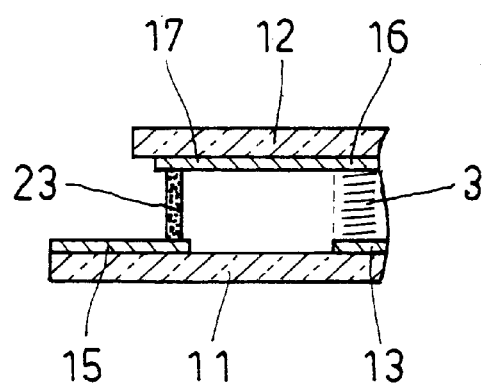
FIG. 5 is a sectional view taken along line 5—5 of FIG. 4.

FIGS. 4 and 5 show a construction example wherein the super-resolution optical panel 10 described in the foregoing is partially modified, and in the figures, parts corresponding to those in FIGS. 1 to 3, except the sealing member, are denoted by like reference numerals for convenience in illustration.

With this super-resolution optical panel 10, the shape of a second take-out electrode 15 as well as a third take-out electrode 17 is somewhat modified while an anisotropic electrically conductive sealing member 23 is used as a sealing member so as to be able to double as the electrically conductive adhesive 18 in the case of the previously described example. Accordingly, the anisotropic electrically conductive sealing member 23 is disposed so as to encircle the outside of a first circular transparent electrode 13, and to pass between overlapping parts (as seen in a plan view) of the second take-out electrode 15 and the third take-out electrode 17.

The anisotropic electrically conductive sealing member 23 is formed by mixing a multitude of electrically conductive particles in an insulating adhesive, and has electric conductivity in the direction of thickness when pressed for adhesion, but has insulating property in the direction orthogonal to the direction of thickness (lateral direction).

Accordingly, the second take-out electrode 15 and the third take-out electrode 17 are rendered electrically continuous with each other via anisotropic electrically conductive sealing member 23, but these electrodes are not rendered electrically continuous with a first take-out electrode 14.

In other respects, the configuration of the super-resolution optical panel 10 according to this example is the same as that for the super-resolution optical panel 10 previously described with reference to FIGS. 1 to 3, and further description thereof is therefore omitted.

Figure 6:
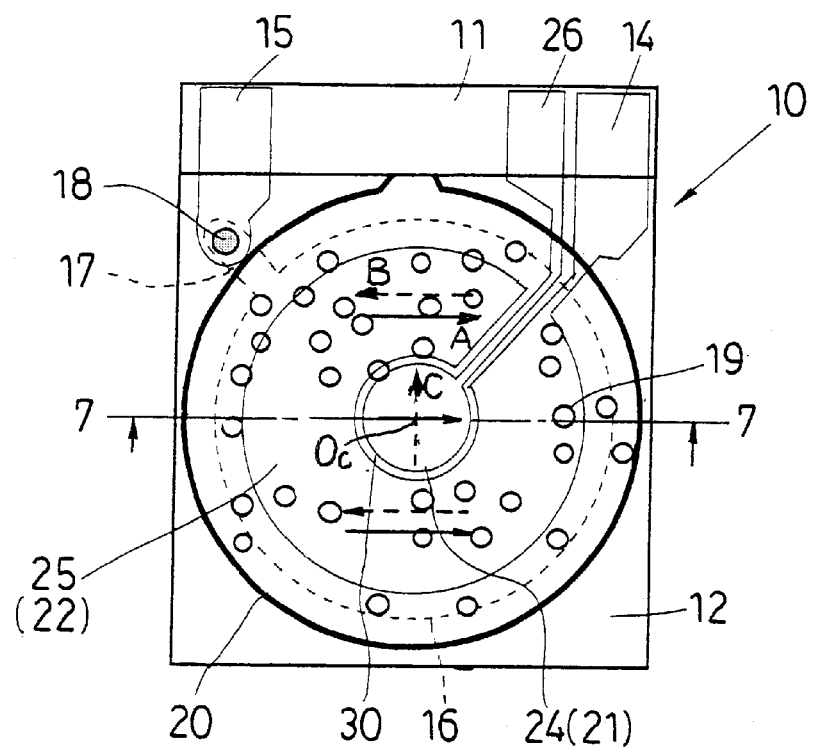
FIG. 6 is a plan view of still another example of a super-resolution optical panel fabricated by still another embodiment of a method of fabricating a super-resolution optical panel according to the invention, as seen from the side of a second substrate thereof.
Figure 7:
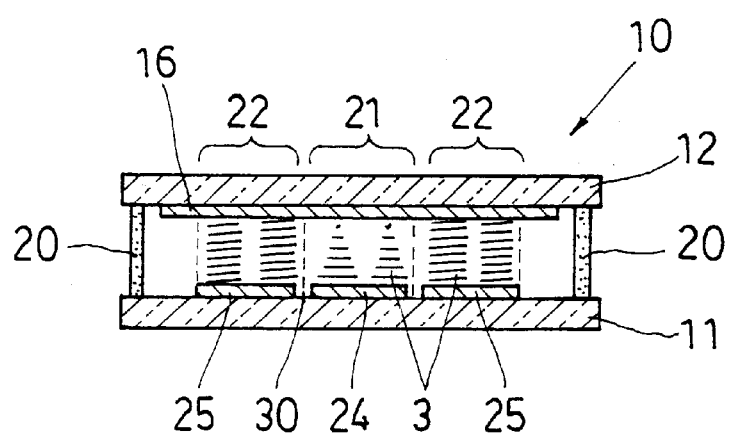
FIG. 7 is a sectional view taken along line 7—7 of FIG. 6.

FIGS. 6 and 7 are views showing another example of a super-resolution optical panel corresponding to FIGS. 1 and 2, respectively, and in the figures, parts corresponding to those in FIGS. 1 to 3, except a part corresponding to the first circular transparent electrode, are denoted by like reference numerals for convenience in illustration.

With this super-resolution optical panel 10, there are disposed on the inner surface of a first substrate 11 a central circular transparent electrode 24 formed in a small circular shape centering round the optical center Oc in place of the first circular transparent electrode 13 in the case of the example previously described, and a ring-like transparent electrode 25 provided with a narrow annular space (a gap) 30 interposed between the outside of the central circular transparent electrode 24 and the ring-like transparent electrode 25. Further, a first take-out electrode 14 for connecting the ring-like transparent electrode 25 to an external terminal, and a fourth take-out electrode 26 for connecting the central circular transparent electrode 24 to an external terminal are formed adjacent to each other.

In other respects, the configuration of the super-resolution optical panel 10 is the same as that of the super-resolution optical panel 10 previously described with reference to FIGS. 1 to 3, except that, as clearly shown in FIG. 7, a region corresponding to the central circular transparent electrode 24 becomes a twisted alignment region 21, and a region corresponding to the ring-like transparent electrode 25 becomes a parallel alignment region 22, thus differentiating these regions from each other distinctly.

Method of Fabricating a Super-resolution Optical Panel: FIGS. 8 to 26

Next, embodiments of a method of fabricating the respective super-resolution optical panels described above, according to the invention, are described hereinafter.

A method of fabricating the super-resolution optical panel previously described with reference to FIGS. 1 to 3 (referred to as "a basic example" hereinafter) is mainly described, and as for a method of fabricating other super-resolution optical panels previously described, only steps thereof differing from the former will be described.

Figure 8:
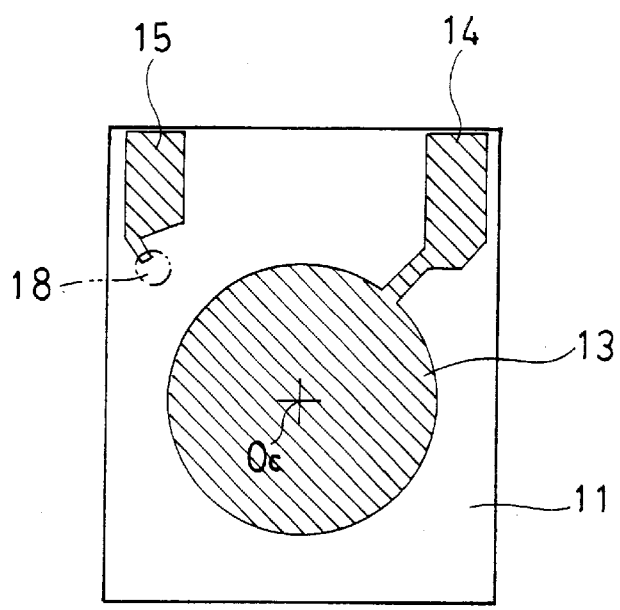
FIGS. 8 to 26 are views sequentially showing respective steps of the method of fabricating the various super-resolution optical panels, according to the invention.
Figure 9:
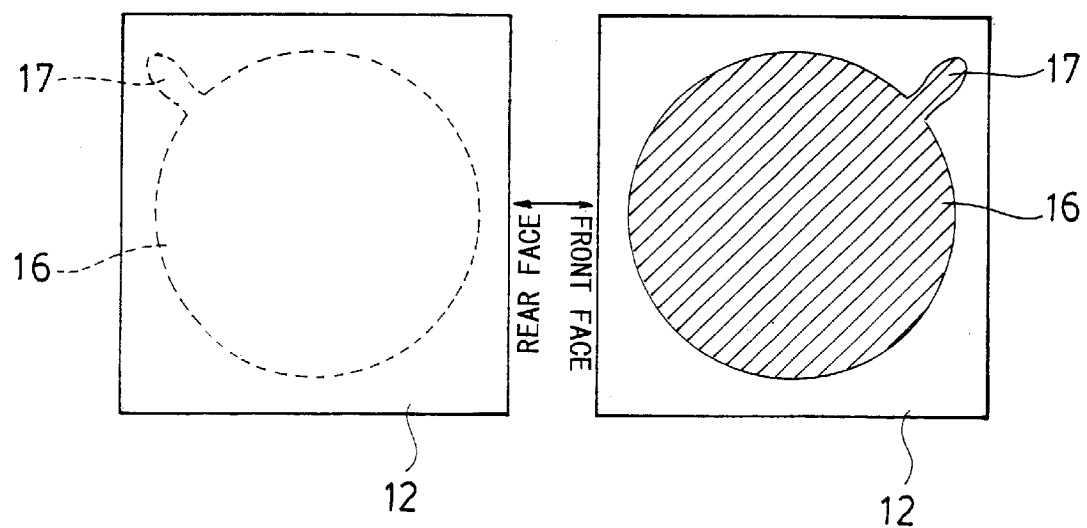

As shown in FIGS. 8 and 9, in the fabrication of the respective super-resolution optical panels previously described, a first substrate 11 (FIG. 8) and a second substrate 12 (FIG. 9) made up of a transparent glass sheet, respectively, are prepared. The first substrate 11 and the second substrate 12 are substrates rectangular and square in shape, respectively, a pair of sides of the former being equal in length to a pair of sides of the latter, and are disposed such that a portion of the first substrate 11 along a shorter side thereof is protruded from a side of the second substrate 12 when both the substrates are overlapped with each other.

In the fabrication of the super-resolution optical panel described above with reference to the basic example, and FIGS. 4 and 5, respectively, a transparent and electrically conductive film such as an ITO film is first formed on one of the surfaces of the first substrate 11 at sheet resistance of 100 to 200 $\Omega/\gamma$ by the low temperature sputtering method or the vacuum evaporation method.

Thereafter, the transparent and electrically conductive film is patterned in a circle by use of a photo mask prepared beforehand, thereby forming a first circular transparent electrode 13 5000 $\mu$m in diameter, centering round the optical center Oc as shown in FIG. 8. Simultaneously, a first take-out electrode 14 extended from the first circular transparent electrode 13 for connecting the first circular transparent electrode 13 to an external terminal, and an isolated second take-out electrode 15 for connecting a second circular transparent electrode 16 as described later on to an external terminal, are formed in close proximity of the opposite edges of the portion of the first substrate 11 along the shorter side thereof.

Meanwhile, after forming a transparent and electrically conductive film all over one of the surfaces of the second substrate 12 as well, the transparent and electrically conductive film is patterned, thereby forming the second circular transparent electrode 16, and a third take-out electrode 17 extended therefrom as shown in FIG. 9.

FIG. 9 shows a view of the second substrate 12 wherein a surface with the second circular transparent electrode 16 formed thereon faces the plane of the figure (shown as the front face), and a view thereof wherein the surface faces away from the plane of the figure.

The second circular transparent electrode 16 is patterned in a circle larger in diameter by about 100 to 500 $\mu$m than the first circular transparent electrode 13 formed on the first substrate 11 such that the center of the circle becomes coincident with the optical center Oc used in forming the first circular transparent electrode 13 on the first substrate 11.

The third take-out electrode 17 is formed at a position where a part thereof overlaps the second take-out electrode 15 formed on the first substrate 11 as seen in a plan view when the second substrate 12 is bonded to the first substrate 11 so as to overlap each other.

In the case of fabricating the super-resolution optical panel previously described with reference to FIGS. 6 and 7, there may be patterned on one of the surfaces of the first substrate 11 a central circular transparent electrode 24 as shown in FIG. 6 and a ring-like transparent electrode 25 provided with a narrow annular space 30 disposed on the outside of the central circular transparent electrode 24 in place of the first circular transparent electrode 13 described above.

In this case, the central circular transparent electrode 24 is formed in the shape of a circular electrode having a diameter in a range of 800 to 1400 $\mu$m, centering round the optical center Oc. Subsequently, the space 30 without a transparent electrode provided therein is formed so as to extend outwards from the outer rim of the central circular transparent electrode 24 to the extent of a width in a range of 10 to 100 μm. Furthermore, the ring-like transparent electrode 25 having an outer diameter of 5000 μm and a width of 4000 μm, centering round the optical center Oc, is formed on the outside of the space 30.

In addition, as shown in FIG. 6, there are formed a first take-out electrode 14 extending from the ring-like transparent electrode 25 disposed on the outer side, and a fourth take-out electrode 26 extending from the central circular transparent electrode 24.

Next, a step of forming alignment layers is described hereinafter by reverting to the basic example.

Figure 10:
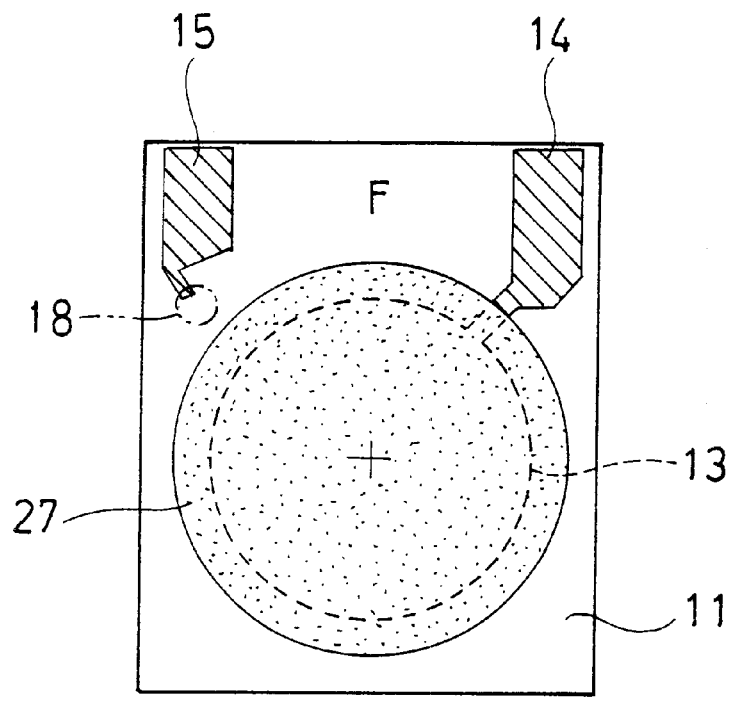
Figure 11:
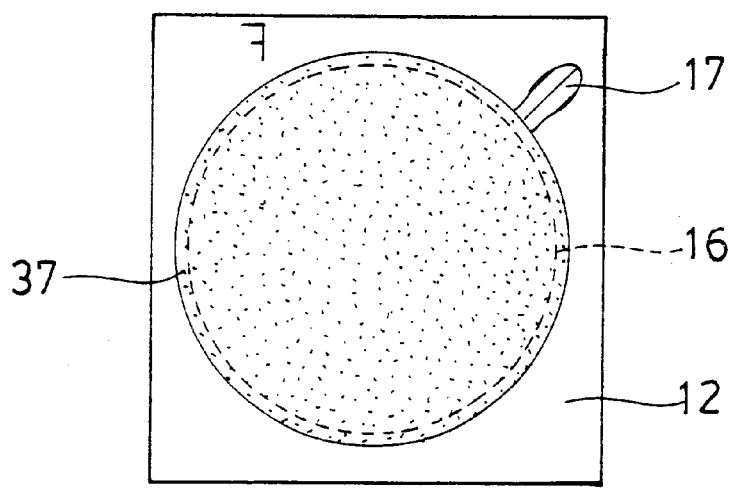

As shown in FIGS. 10 and 11, alignment layers 27 and 37, composed of polyimide solution (JALS-612 (manufactured by JSR)) are formed on the first circular transparent electrode 13 formed on the first substrate 11, and the second circular transparent electrode 16 formed on the second substrate 12, respectively, to a thickness in a range of 0.05 to 0.09 μm by applying polyimide solution thereto with the use of an offset printing machine, and are baked at a temperature in a range of 200 to 250° C. for 1 to 1.5 hours.

At this point in time, the alignment layer 27 is formed slightly larger than the first circular transparent electrode 13 so as to fully cover the same, and the alignment layer 37 is formed slightly larger than the second circular transparent electrode 16 so as to fully cover the same, taking care, however, not to form the alignment layers 27 and 37 over the first to third take-out electrodes 14, 15 and 16, respectively.

Now, a "pattern F" and a "pattern inverted F" provided on the first substrate 11 in FIG. 10, and the second substrate 12 in FIG. 11, respectively, indicate that the front face and the rear face of one of the substrates are opposite to those of the other, respectively.

Thereafter, an alignment treatment is applied to the alignment layers 27 and 37, respectively, by a rubbing method using a cotton rubbing cloth.

Figure 12:
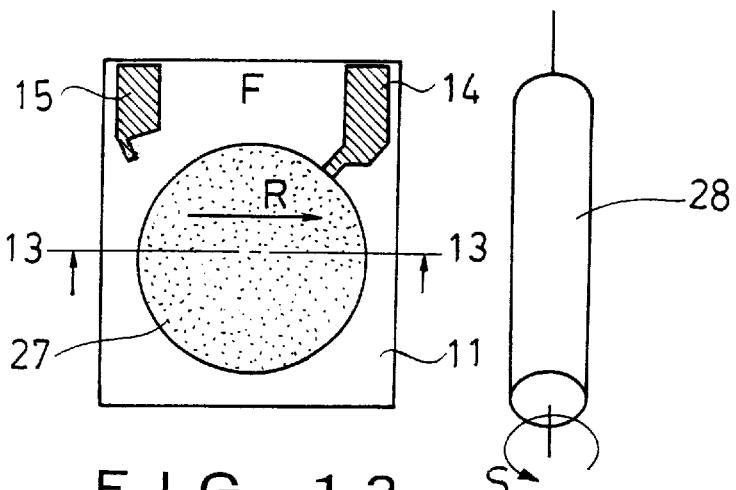

In FIG. 12, the position of a rubbing roll 28, relative to the alignment layer 27 on the first substrate 11, and an advancing direction of the rubbing roll 28 are shown.

In this case, a rotation direction S of the rubbing roll 28 is counterclockwise, and the advancing direction R is oriented from the left side to the right side of the first substrate 11 as shown by the arrow indicated by the solid line.

Figure 14:
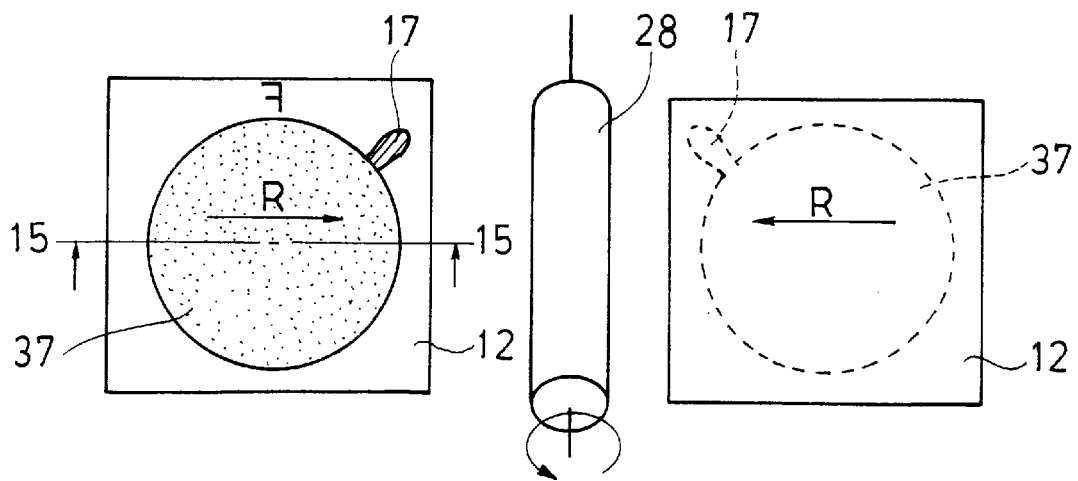

As shown in FIG. 14, the advancing direction R of the rubbing roll 28 is also oriented from the left side to the right side of the alignment layer 37 on the second substrate 12 in a state of the "pattern inverted F" such that an alignment direction of the alignment layer 27 is in parallel with that of the alignment layer 37 when the second substrate 12 is overlapped (overlapped in a state as shown on the right-hand side in FIG. 14) with the first substrate 11.

Figure 13:
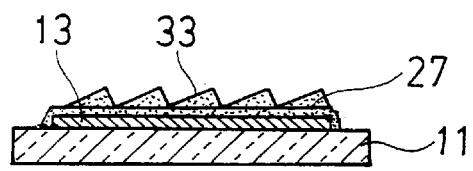
Figure 15:
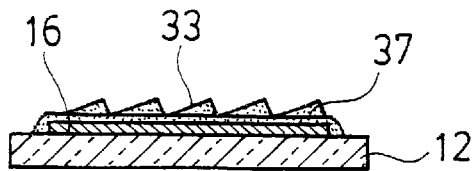

Hereupon, first pre-tilt angles 33 formed on the alignment layers 27, 37, respectively, are opposed to the advancing direction R of the rubbing roll 28 as shown in a schematic sectional view of FIGS. 13 and 15, respectively.

Rubbing is executed on conditions such that a thrust amount of a buffing material of the rubbing roll 28 is adjusted to be 0.6 mm, and a revolution speed of the rubbing roll 28 is set at 1000 rpm. The respective substrates are reciprocatively fed three times at a feed rate of 25 mm/sec.

Figure 16:
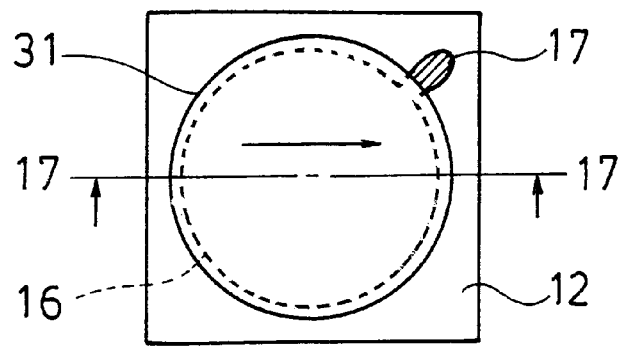
Figure 17:
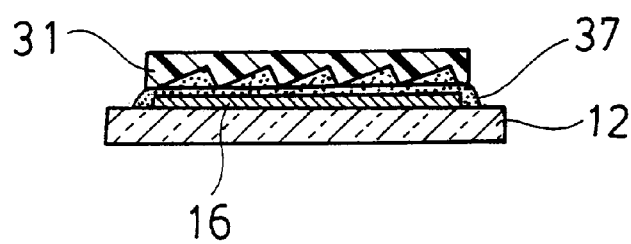

Subsequently, as shown in FIGS. 16 and 17, a positive photosensitive resist (MRM-001/manufactured by JSR) 31 is applied onto the second substrate 12 by the spin coater method, and is formed to a thickness in a range of 0.8 to 1.2 μm.

Thereafter, the positive photosensitive resist 31 is prebaked at a temperature in a range of 80 to 100° C. for a duration of 1 to 10 minutes.

Figure 18:
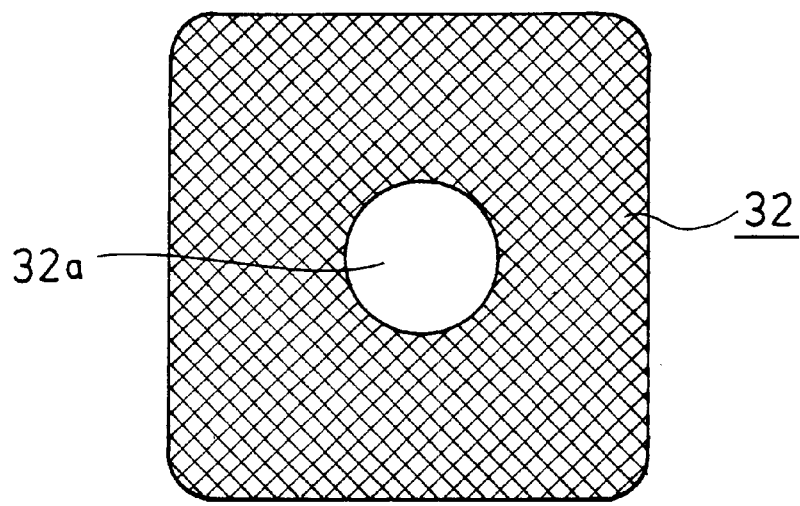
Figure 19:
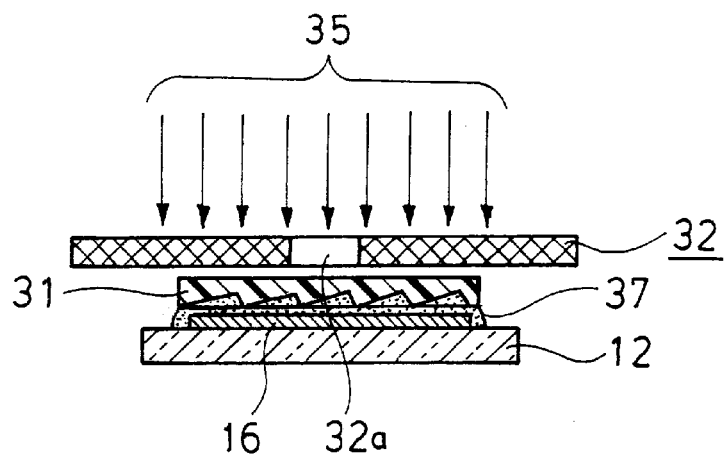

Subsequently, a photo mask 32 made up of a thin metal sheet having a through-hole 32a in a circular shape at the center thereof as shown in FIG. 18 is disposed on the positive photosensitive resist 31 such that the center of the photo mask 32 is coincident with the center of the second circular transparent electrode 16 as shown in FIG. 19. Then, an exposure treatment is applied thereto with light 35 having exposure energy in a range of 200 to 350 mJ/cm$^2$, emitted from a light source (not shown) such as a halogen lamp, and so forth.

As a result, only a portion of the positive photosensitive resist 31 corresponding to the through-hole 32a of the photo mask 32 is subjected to exposure, and reacts to light. The through-hole 32a of the photo mask 32 is sized so as to have a diameter in a range of 800 to 1000 μm. Further, the photo mask 32 may be formed in a doughnut-like shape having a diameter on the order of 5000 μm.

After the exposure treatment, the second substrate 12 is immersed and shaken in a developing solution (CD-902/manufactured by JSR) for a duration of 1 to 5 minutes, thereby removing the portion of the positive photosensitive resist 31, reacted to light, by dissolving the same.

Thereafter, a remaining portion of the positive photosensitive resist 31 is cured by post-baking the same in a furnace or on a hot plate at a temperature in a range of 90 to 120° C. for a duration of 5 to 15 minutes.

Figure 20:
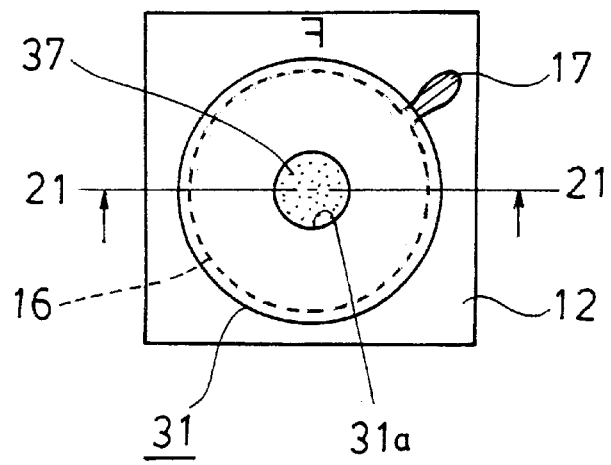
Figure 21:
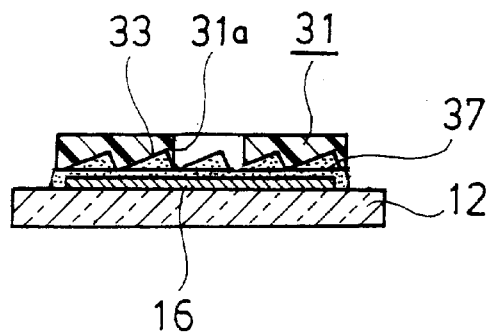

As a result, the positive photosensitive resist 31 is patterned in a doughnut-like shape with an opening 31a in a circular shape formed at the center thereof, thereby exposing the central part of the alignment layer 37 within the opening 31a as shown in FIG. 20 and FIG. 21 which is a schematic sectional view taken along line 21—21 of FIG. 20.

Thereafter, a second rubbing treatment is applied onto the second substrate 12.

Figure 22:
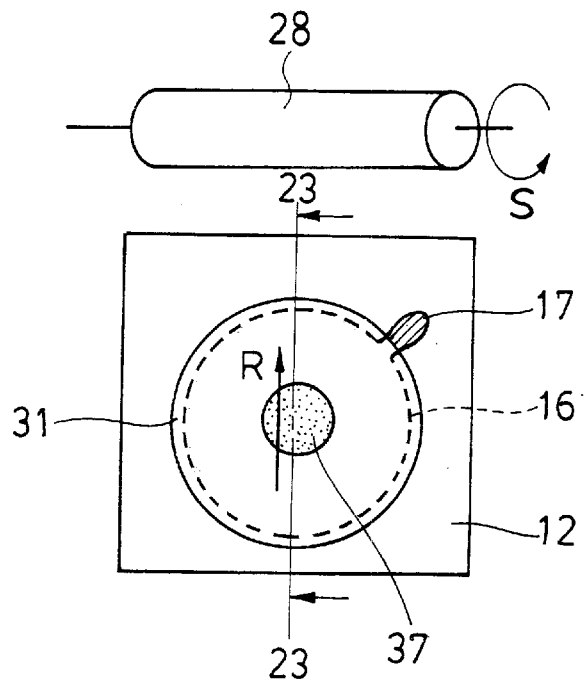

At this point in time, as shown in FIG. 22, the rubbing roll 28 is caused to advance toward the second substrate 12 in a state of the "pattern inverted F" in an advancing direction R which is the vertical direction while rotating the rubbing roll 28 in a rotation direction S. The advancing direction R is the direction orthogonal to the advancing direction at the time of a rubbing treatment applied for the first time.

Figure 23:
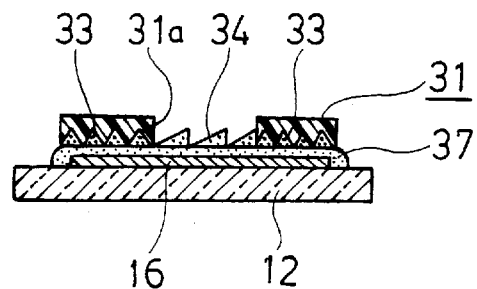
Figure 24:
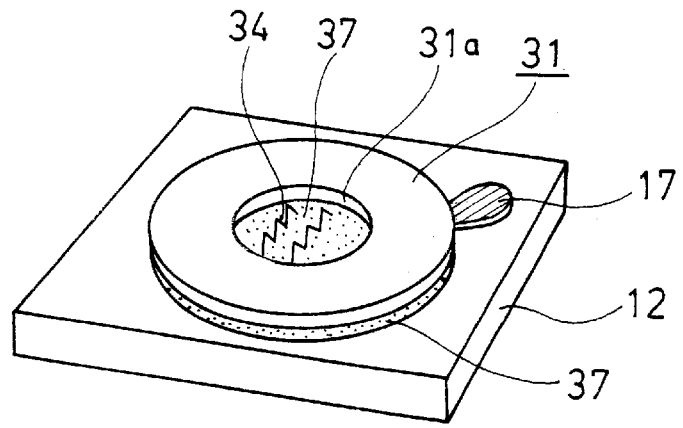

By applying the second rubbing treatment in this way, an alignment treatment is applied to a portion of the alignment layer 37 exposed inside the opening 31a of the positive photosensitive resist 31, and as shown in FIGS. 23 and 24, second pre-tilt angles 34 tilted in the direction orthogonal to the direction of the first pre-tilt angles 33 are formed.

Figure 25:
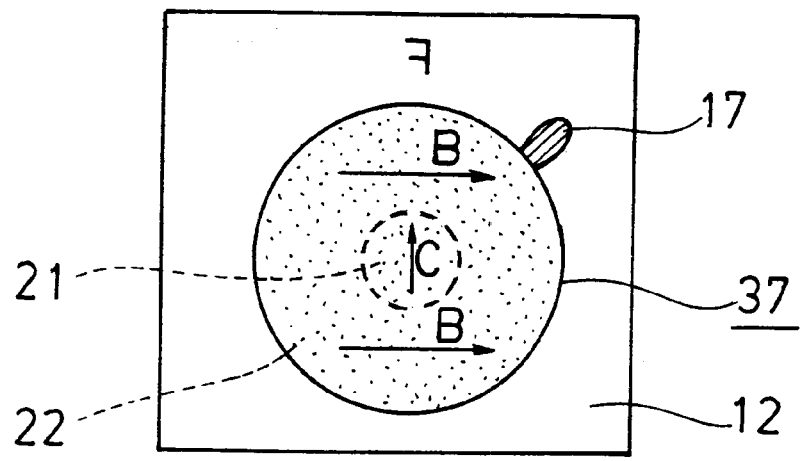
Figure 26:
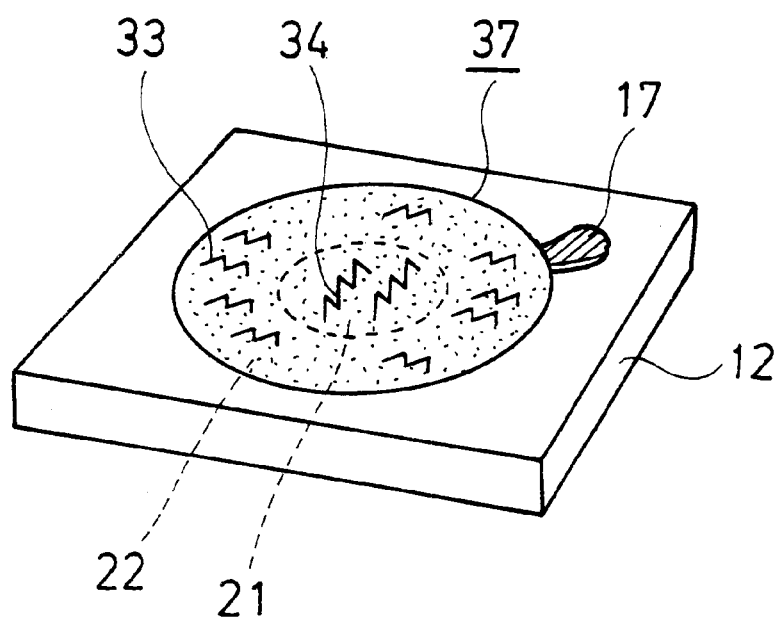

Thereafter, the second substrate 12 is immersed in a remover (CS-1001/manufactured by JSR) for a duration of about 1 to 10 minutes, and thereby the positive photosensitive resist 31 on the second substrate 12 is peeled off. Further, the second substrate 12 is washed in water for a duration of 1 minute, and dried, whereupon the alignment layer 37 will be in a state as shown in FIG. 25, a plan view thereof, and FIG. 26, a perspective view thereof.

More specifically, the alignment layer 37 on the second substrate 12 is provided with two alignment regions, that is, a parallel alignment region 22 having the first pre-tilt angles 33, and a twisted alignment region 21 having the second pre-tilt angles 34. The arrows B and C shown in FIG. 25 indicate the alignment direction of the respective regions. Conditions are set such that the first and second pre-tilt angles 33 and 34 of the respective alignment layers 27 and 37 are in a range of about 1 to 2.5° according to values measured by the crystal rotation method.

Subsequently, the sealing member 20 of a thermosetting type, provided with the filling hole 20a, is formed on the first substrate 11 in such a way as to encircle the first circular transparent electrode 13 as shown FIG. 1.

Thereafter, the gap members 19 are scattered mostly inside the region encircled by the sealing member 20 of the thermosetting type, formed on the first substrate 11, by use of a sprinkler according to the dry method or the wet method. For the gap members 19, plastic beads or silica beads of grain size in a range of 7 to 10 μm are used.

In the case of using the plastic beads, the same are scattered on conditions of 150 to 200 pcs./mm$^2$ in order to ensure uniformity in a cell gap. In the case of using the silica beads, the same are scattered on conditions of 50 to 100 pcs./mm$^2$.

Meanwhile, the electrically conductive adhesive 18 (refer to FIG. 1) is formed on the third take-out electrode 17 (refer to FIG. 25) continuous from the second circular transparent electrode 16 formed on the second substrate 12 by the screen printing method.

For the electrically conductive adhesive 18, silver paste A-700 (manufactured by Toyo Ink Co., Ltd.) is used, and is formed in a circle on the order of 250 μm in diameter.

Thereafter, the first substrate 11 and the second substrate 12 are overlapped with each other using a predetermined alignment mark (not shown) such that the surfaces thereof with the circular transparent electrodes 13 and 16 as well as the alignment layers 27 and 37 formed thereon, respectively, are opposed to each other.

At this point in time, in order to cure the sealing member 20, pressure ranging from 0.4 to 1.2 kg/cm$^2$ is applied to the first substrate 11 and the second substrate 12 that are overlapped with each other by use of an air bag, and the sealing member 20 is baked in a furnace at a temperature in a range of 120 to 160° C. for a duration of 1 to 2 hours.

Thereafter, twisted nematic liquid crystal having a pitch of 90 μm or more is filled into the gap between the first substrate 11 and the second substrate 12 through the filling hole 20a of the sealing member 20 by the vacuum injection method at room temperature, and subsequently, the filling hole 2a is closed with a sealant. For the liquid crystal, for example, CZ-4616 (manufactured by Chisso Petrochemical Co., Ltd.) is used.

By bonding the first substrate 11 to the second substrate 12 so as to overlap each other in this way, the alignment directions of the alignment layers sandwiching the liquid crystal layer therebetween cross each other at right angles in the twisted alignment region 21, so that the liquid crystal layer in that region will have 90-degree twisted alignment while the alignment directions of the alignment layers sandwiching the liquid crystal layer therebetween are parallel with each other in the parallel alignment region 22, so that the liquid crystal layer in that region will have homogeneous alignment.

Thus, the super-resolution optical panel according to the basic example is completed. In the case of fabricating the super-resolution optical panel previously described with reference to FIGS. 6 and 7, the step of forming the alignment layers, and respective steps thereafter are exactly the same as those for the case of the basic example except that the alignment layer 37 on the second substrate 12 is formed on the central circular transparent electrode 24 and the ring-like transparent electrode 25.

In the case of fabricating the super-resolution optical panel previously described with reference to FIGS. 4 and 5, steps of fabrication differs from those for the basic example only in that, in place of the step of forming the sealing member in the case of the basic example, the anisotropic electrically conductive sealing member 23 is formed so as to encircle the outside of the first circular transparent electrode 13 on the first substrate 11, and to pass over the second take-out electrode 15, dispensing with the formation of the electrically conductive adhesive member 18 towards the side of the second substrate 12.

Method of Fabricating Multiple Pieces of Super-resolution Optical Panels: FIGS. 27 to 34

With the method of fabricating the super-resolution optical panels of various types described above, cases of fabricating the same on the basis of a single piece each time are described referring to the figures, however, it is a normal practice to fabricate a multiple pieces of the super-resolution optical panels at a time with the use of a pair of glass substrates.

A method of fabricating the super-resolution optical panel according to the basic example on such a basis is described hereinafter with reference to FIGS. 27 to 32.

In this case, a first substrate 1 and a second substrate 2 for use in the fabrication of a multiple pieces of the super-resolution optical panels are prepared, and there are formed at a time first circular transparent electrodes 13, first take-out electrodes 14, and second take-out electrodes 15, for 48 pieces of the super-resolution optical panels, on the first substrate 1, as well as second circular transparent electrodes 16, and third take-out electrodes 17, for 48 pieces of the super-resolution optical panels, on the second substrate 2. However, since the contents of these steps of fabrication are the same as those of the previously described steps of fabricating those parts on the first substrate 11 and the second substrate 12, detailed description thereof is omitted.

Steps of forming alignment layers 27 and 37 on the respective electrodes, and applying an alignment treatment thereto, respectively, by the rubbing method, are also the same as those previously described.

Figure 27:
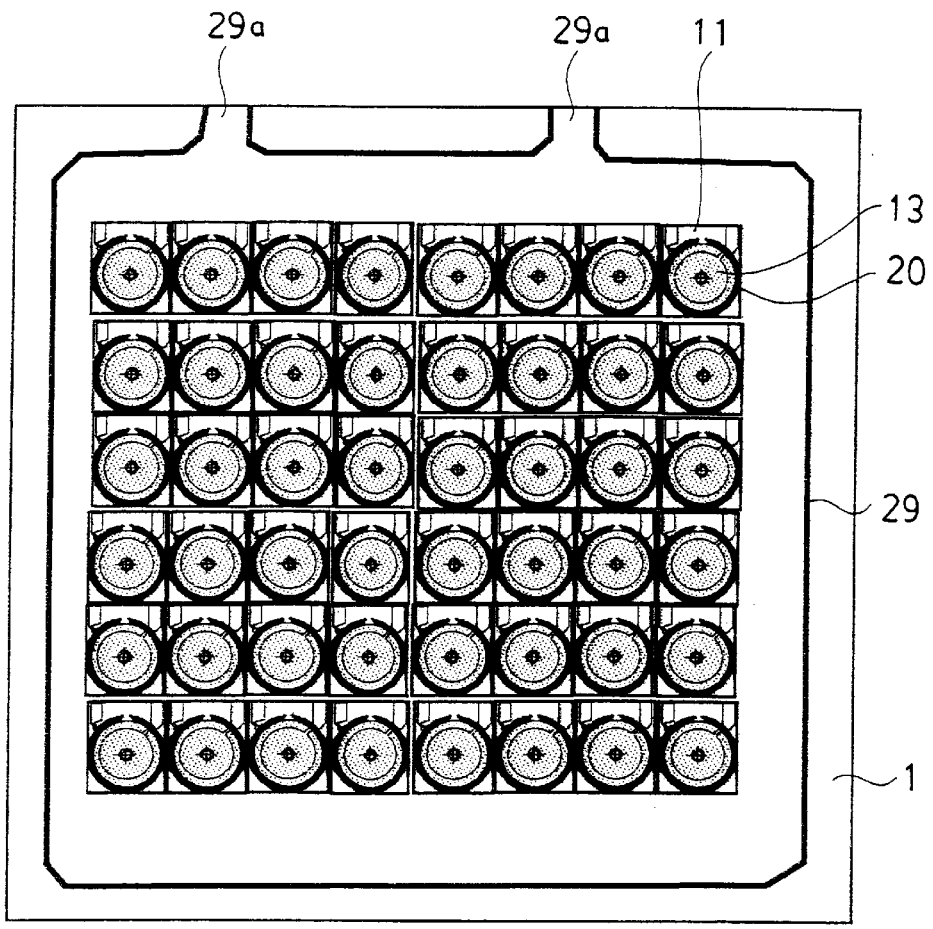
FIGS. 27 to 34 are views partially showing steps of a method of fabricating a multiple pieces of super-resolution optical panels at a time according to the invention.
Figure 28:
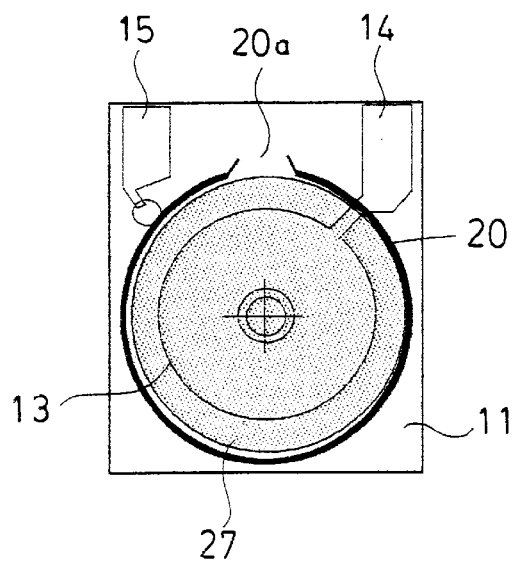

Upon completion of the step of applying the alignment treatment, a sealing member 20 of a thermosetting type is formed in such a way as to encircle respective first circular transparent electrodes 13 on the first substrate 1 composing a multiple pieces of super-resolution optical panels, as shown in FIG. 27. The respective sealing members 20 are patterned in a form resembling the letter C or U, having a filling hole 20a as shown in FIG. 28 which is an enlarged view of a region of a single piece of the super-resolution optical panel.

Further, a second sealing member 29 as shown in FIG. 27 is patterned so as to enclose all the liquid crystal panels encircled by the respective sealing members 20. The second sealing member 29 is also provided with a plurality of filling holes 29a.

Figure 29:
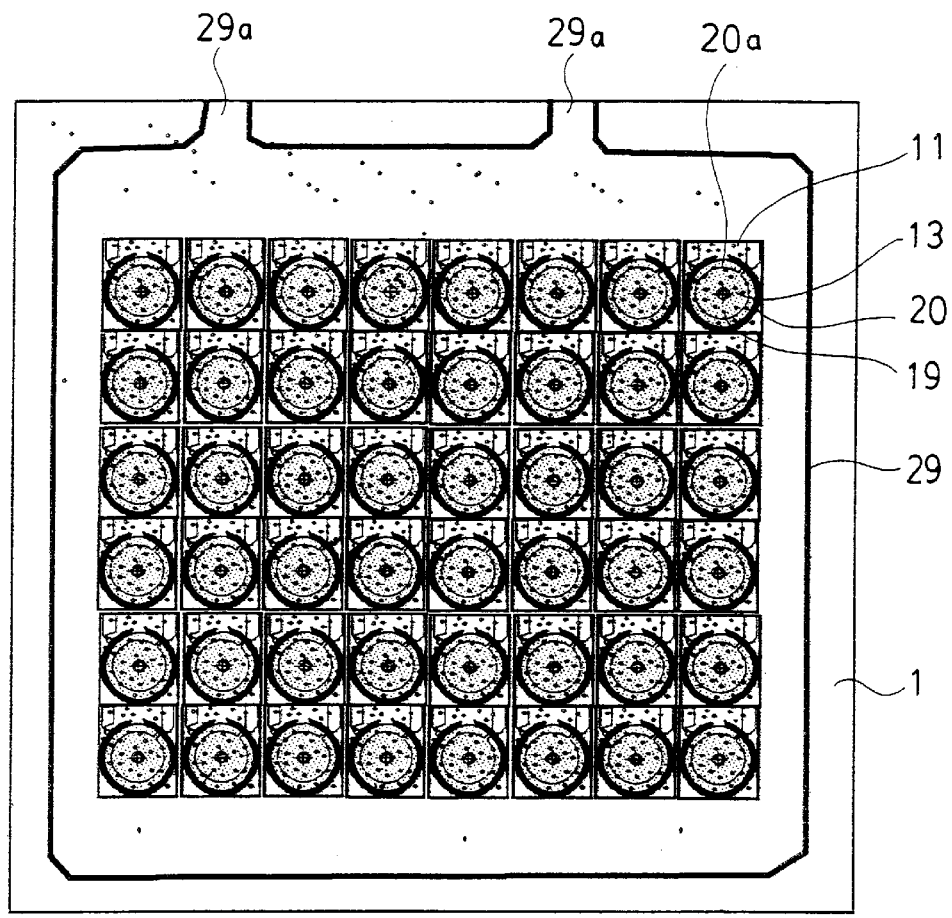

Subsequently, as shown in FIG. 29, gap members 19 are scattered on the first substrate 1 by use of a sprinkler according to the dry method or the wet method. For the gap members 19, plastic beads or silica beads of grain size in a range of 7 to 10 μm are used.

In the case of using the plastic beads, the same are scattered on conditions of 150 to 200 pcs./mm$^2$ in order to ensure uniformity in a cell gap.

In the case of using the silica beads, the same are scattered on conditions of 50 to 100 pcs./mm$^2$.

Figure 30:
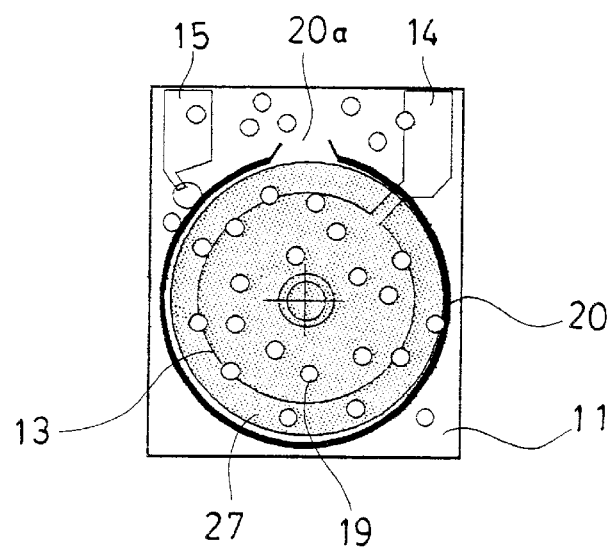

FIG. 30 is an enlarged view of a region of a single piece of the super-resolution optical panel, showing a state of a first substrate 11 after the gap members 19 is scattered thereon.

Figure 31:
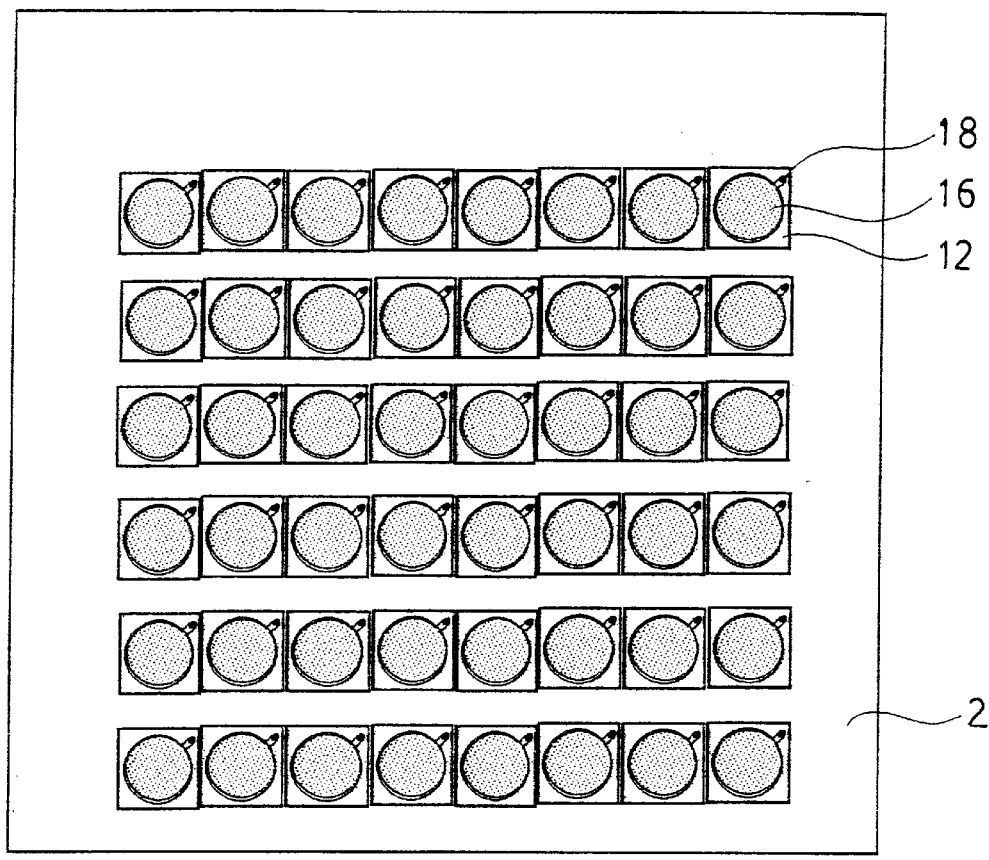
Figure 32:
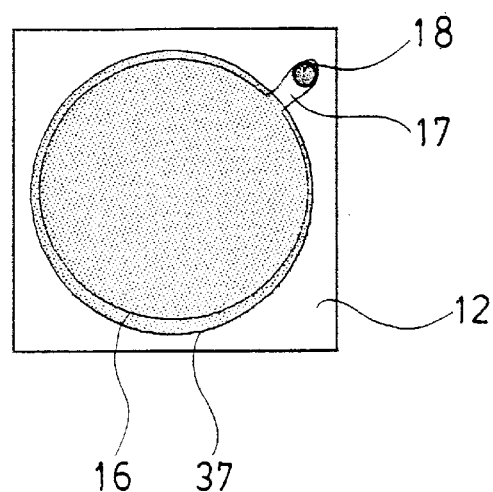

Next, as shown in FIG. 31, an electrically conductive adhesive 18 is formed by the screen printing method on the respective third take-out electrodes 17 connected with the respective second circular transparent electrodes 16 formed on the second substrate 2. FIG. 32 is an enlarged view of a region of a single piece of the super-resolution optical panel, showing a state wherein the electrically conductive adhesive 18 is formed.

For the electrically conductive adhesive 18, silver paste A-700 (manufactured by Toyo Ink Co., Ltd.) is used, and is formed in a circle on the order of 250 µm in diameter.

Thereafter, the second substrate 2 and the first substrate 1 are overlapped with each other using a predetermined alignment mark (not shown).

At this point in time, in order to cure the respective sealing members 20 and the second sealing member 29, pressure ranging from 0.4 to 1.2 kg/cm$^2$ is applied to the first substrate 1 and the second substrate 2 that are overlapped with each other by use of an air bag, and the respective sealing members 20 and the second sealing member 29 are baked in a furnace at a temperature in a range of 120 to 160° C. for a duration of 1 to 2 hours.

Thereafter, twisted nematic liquid crystal having a pitch of 90 µm or more, for example, CZ-4616 (manufactured by Chisso Petrochemical Co., Ltd.), is filled into a gap between the first substrate 1 and the second substrate 2 through the filling holes 29a of the second sealing member 29 by the vacuum injection method at room temperature.

In this case, a difference Δn between refractive indices of liquid crystal to be filled against respective wavelengths at 25° C. is adjusted by the value of the wavelength of laser beams used, that is, 780 nm. In the case of the liquid crystal of CZ6416 (manufactured by Chisso Petrochemical Co., Ltd.), Δn for a wavelength λ at 780 nm is 0.17279. Herein, a cell gap d of respective liquid crystal panels is designed by the following formula (1), aiming at a value of 10.0 µm or more:

$$\Delta n d/\lambda \leq 1.963 \tag{1}$$

Thereafter, the first substrate 1 and the second substrate 2 are cut into respective sizes of a predetermined super-resolution optical panel, matching a shape in which the respective sealing members 20 is patterned, and closing is executed with a UV adhesive to close the respective filling holes 20a, thereby completing 48 pieces of the super-resolution optical panels 10.

Furthermore, each of the super-resolution optical panels 10 may be housed in a predetermined case, and a film reflecting light beams at wavelengths other than that of laser beams having a wavelength at 780 nm may be formed on the rear face of the first substrate 11 as well as the second substrate 12 by the dipping method.

If, for example, L-201 (manufactured by Nissan Chemicals Co., Ltd.) is used for a liquid in this case, and the films are baked in a furnace at 100° C. for a duration of 2 hours, reflectance against laser beams will become 2% or less.

Also, in the case of fabricating the super-resolution optical panel previously described with reference to FIGS. 6 and 7, a multiple pieces of the super-resolution optical panels can be fabricated at a time by taking the same steps as those for the method described above.

Figure 33:
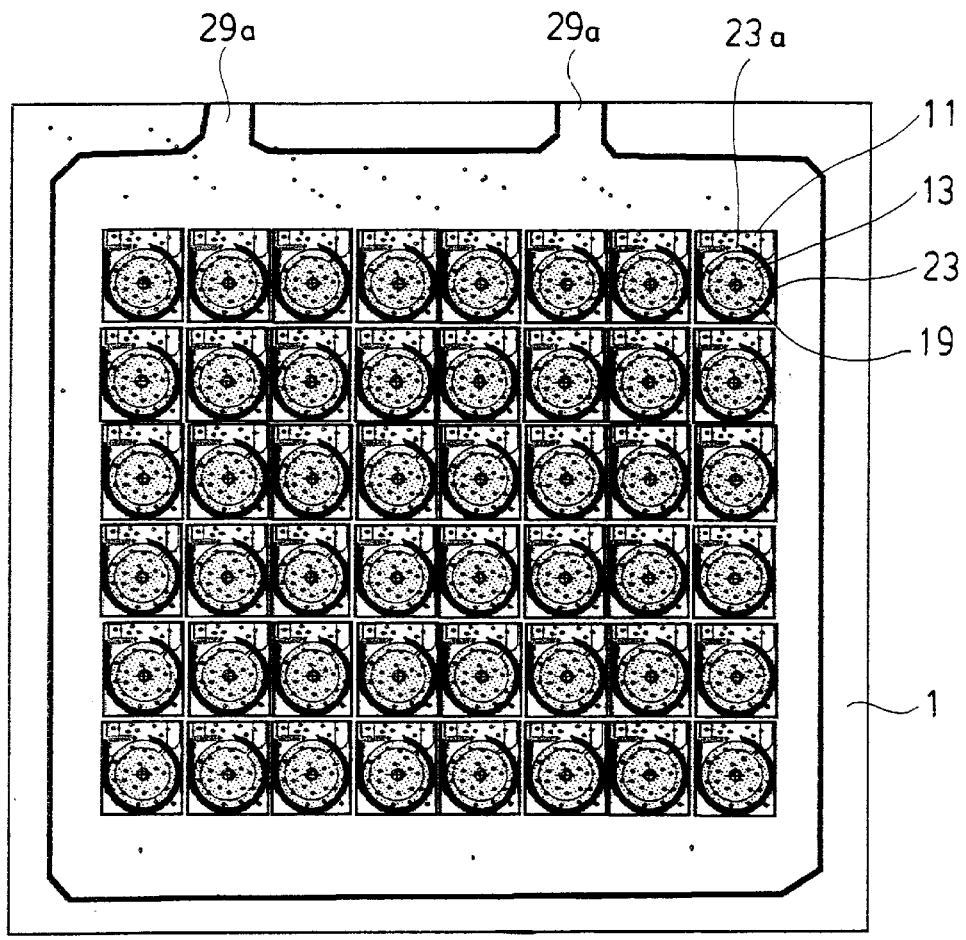
Figure 34:
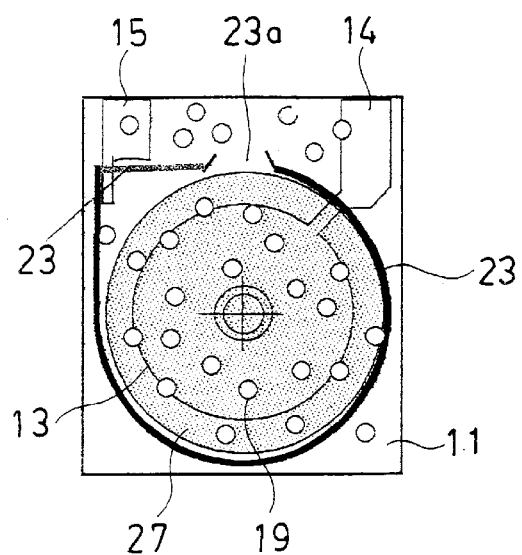

In the case of fabricating a multiple pieces of the super-resolution optical panel previously described with reference to FIGS. 4 and 5, steps of fabrication are the same as those for the method described above except that as a sealing member for respective regions where the individual super-resolution optical panels are formed, as shown in FIGS. 33 and 34, an anisotropic electrically conductive sealing member 23 is patterned so as to encircle the first circular transparent electrode 13, and pass over the second take-out electrode 15, thereby doubling as the electrically conductive adhesive 18.

Further, the number of the multiple pieces is not limited to 48, and any suitable number may be set.

Figure 35:
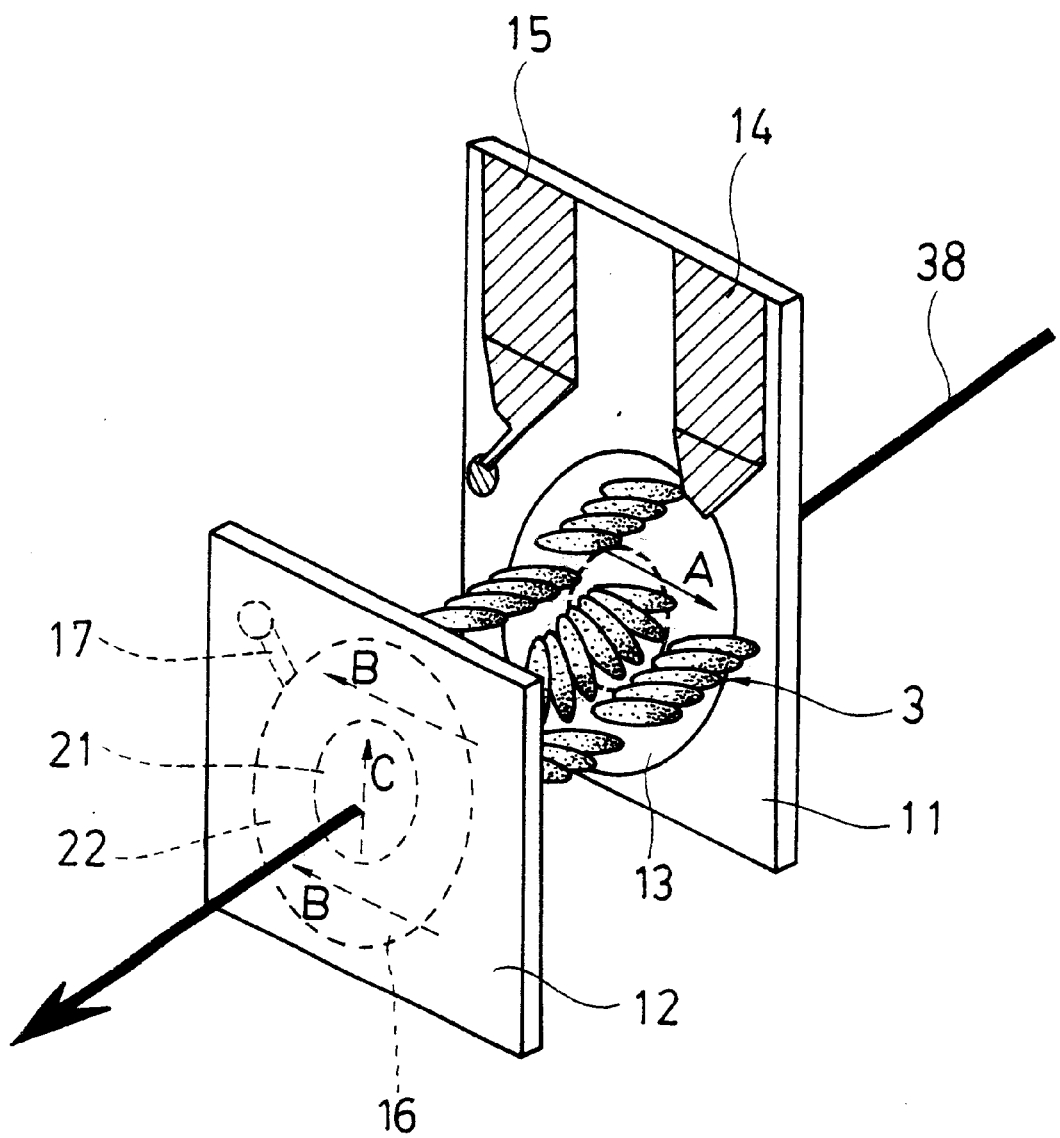
FIGS. 35 to 39 are views illustrating operation and effect of one of the super-resolution optical panels fabricated by the method of fabricating the super-resolution optical panel according to the invention.
Figure 36:
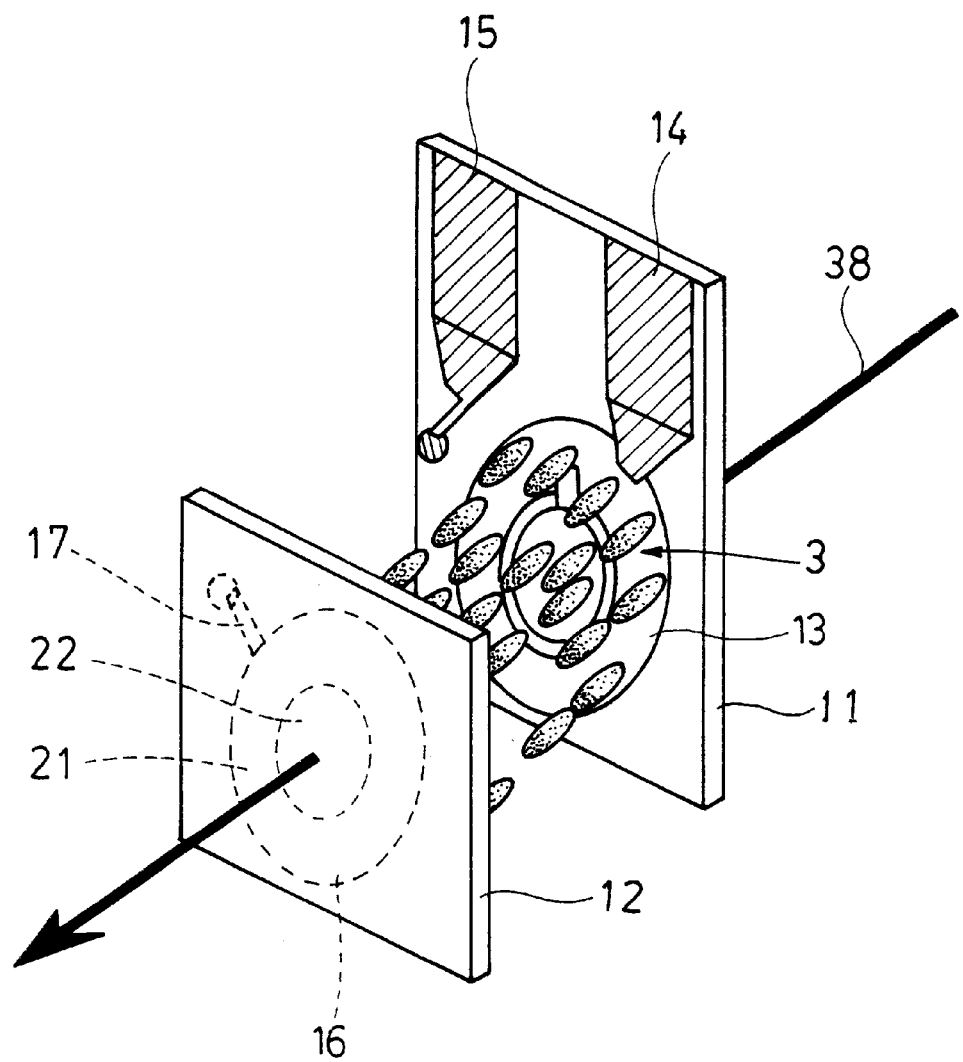

Operation of a Super-resolution Optical Panel: FIGS. 35 and 36

FIG. 35 is a schematic perspective view of the super-resolution optical panel 10 in a state where no voltage is applied thereto.

When no voltage is applied to the twisted nematic liquid crystal 3, liquid crystal molecules thereof are aligned so as to be twisted through 90 degrees in the twisted alignment region 21 around the central part of the first and second circular transparent electrodes 13 and 16, and are aligned in parallel with each other in the parallel alignment region 22 in a ring-like shape, on the outside of the twisted alignment region 21.

As shown in FIG. 35, laser beams 38 at a wavelength of 780 nm fall on the rear face of the first substrate 11, and outgo from the front face of the second substrate 12.

If a polarizing film is disposed on the rear face of the first substrate 11, and the front face of the second substrate 12, respectively, such that absorption axes thereof are parallel with each other, the twisted alignment region 21 at the center becomes dark while the parallel alignment region 22 in the ring-like shape on the outside of the twisted alignment region 21 becomes white as seen from the side of the second substrate 12. Conversely, if the polarizing films on both sides are disposed such that the absorption axes thereof intersect each other, the twisted alignment region 21 at the center becomes white while the parallel alignment region 22 in the ring-like shape becomes dark.

FIG. 36 is a schematic perspective view of the super-resolution optical panel 10 when a voltage is applied thereto. In this case, as a voltage is applied to the twisted nematic liquid crystal 3 sandwiched between the first circular transparent electrode 13 and the second circular transparent electrode 16, all liquid crystal molecules thereof undergo homeotropic alignment as shown in the figure, allowing the laser beams 38 to pass therethrough as they are.

Figure 37:
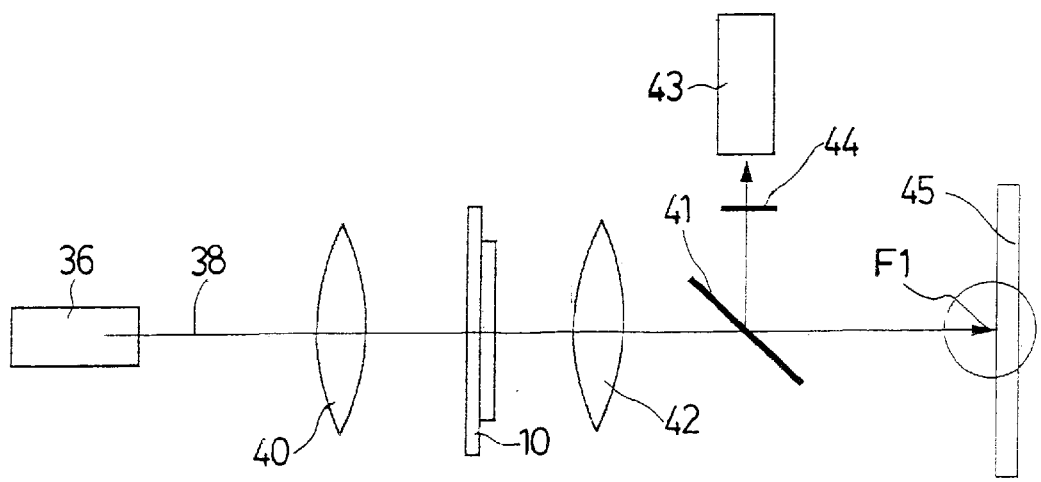

Now, a system for measuring the effect of the super-resolution optical panel is shown in FIG. 37.

First, the super-resolution optical panel 10 is disposed behind a collimator lens 40, and a half mirror 41 is disposed behind the super-resolution optical panel 10 with an objective lens 42 interposed therebetween. Further, an optical disc (DVD or CDR) 45 is disposed behind the half mirror 41. A detector 43 is disposed vertically above the half mirror 41. A laser light source 36 is disposed in front of the collimator lens 40.

When no voltage is applied to the super-resolution optical panel 10 (referred to as "voltage-off time" hereinafter), the laser beam 38 at a wavelength of 780 nm emitted from the laser light source 36 is transmitted through the collimator lens 40, passing through the super-resolution optical panel 10.

Thereafter, the laser beam 38 passes through the objective lens 42, and is divided by the half mirror 41, forming a focal point at a point on the detector 43 and at a point F1 on the optical disc 45. The laser beam passing through the half mirror 41 and a polarizer 44 are received by the detector 43.

Figure 38:
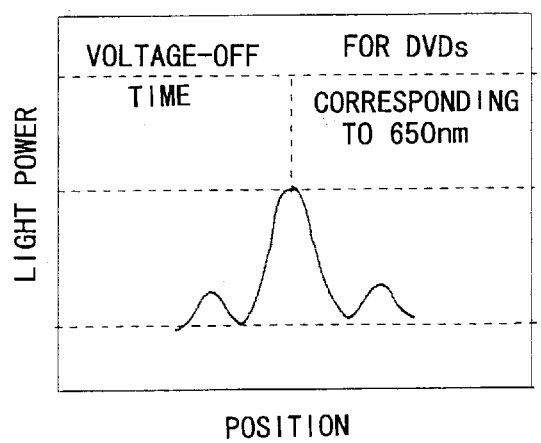

FIG. 38 shows a beam spot profile at this point in time. In this case, it is shown that a focal point is formed at the point F1 on the optical disc 45 with light power for use in DVDs using laser beams at a wavelength of 650 nm.

Figure 39:
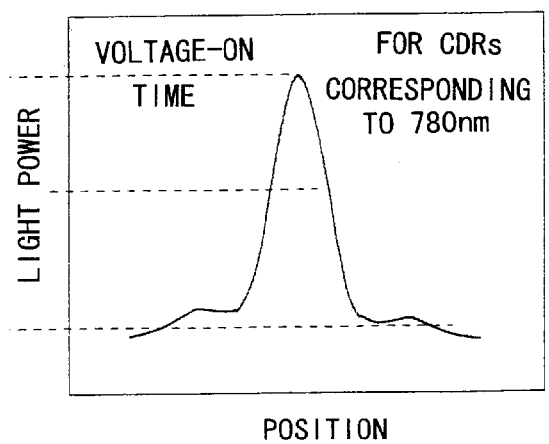
Figure 40:
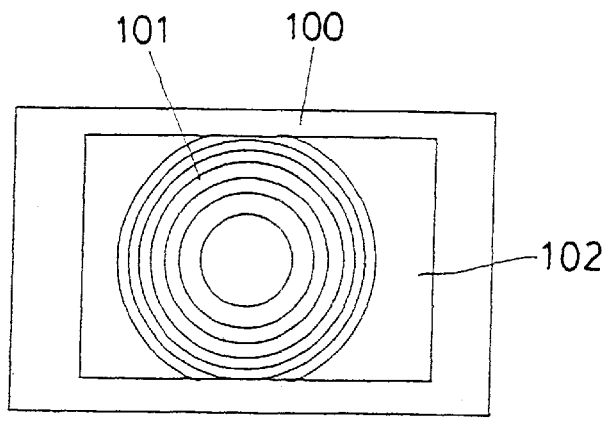
FIGS. 40 to 42 are views illustrating a conventional liquid crystal space optical modulator.
Figure 41:
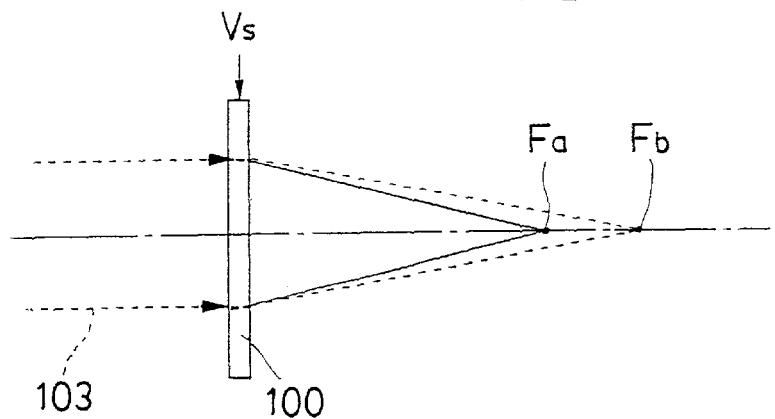
Figure 42:
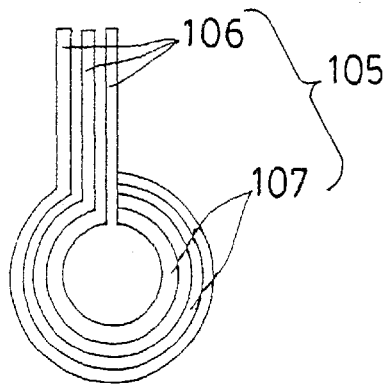

Next, when a voltage is applied to the super-resolution optical panel 10 (referred to as "voltage-on time"

hereinafter), the laser beam 38 at a wavelength of 780 nm pass through the super-resolution optical panel 10 and the objective lens 42, forming a focal point at a point on the detector 43 and at the point F1 on the optical disc 45. In this case, light power at the position of the point F1 is approximately doubled, and a beam spot profile on the detector 43 will be as shown in FIG. 39.

In this case, it is shown that a focal point is formed at the point F1 with light power for use in CDRs using the laser beam 38 at a wavelength of 780 nm.

With the super-resolution optical panel 10, by simply switching over between the voltage-on and the voltage-off with the use of an on/off switch, intensity of light power can be switched over with a class of the laser beams 38 having a wavelength at 780 nm, enabling an optical pickup to be switched over between for use in DVDs and for use in CDRs.

Industrial Applicability

As described hereinbefore, with the method of fabricating the super-resolution optical panel according to the invention, a super-resolution optical panel capable of varying a focal length or radiation light power with ease can be fabricated with relative ease and with certainty. Accordingly, the super-resolution optical panel can become commercially available, and, for example, an optical pickup of an optical disc player can be put to common use for DVDs and CDs, so that the optical disc player in common use for DVDs and CDs can be reduced in size, and can be provided at a low price.

What is claimed is:

1. A method of fabricating a super-resolution optical panel comprising:

a step of preparing a first substrate and a second substrate, both of which are transparent;

a step of forming a first circular transparent electrode on the first substrate;

a step of forming a second circular transparent electrode larger than the first circular transparent electrode, on the second substrate;

a step of forming an alignment layer in a region covering at least the first circular transparent electrode on the first substrate, and in a region covering at least the second circular transparent electrode on the second substrate, respectively;

a step of applying an alignment treatment in a first direction to the respective alignment layers by use of a rubbing roll such that pre-tilt faces of the respective alignment layers are in parallel with each other when the first circular transparent electrode is opposed to the second circular transparent electrode;

a step of forming a resist patterned in a doughnut-like shape provided with an opening in a circular shape at a center thereof, on the alignment layer of the second substrate with the rubbing treatment applied thereto;

a step of applying an alignment treatment in a second direction orthogonal to the first direction to a portion of the alignment layer exposed inside the opening of the resist, by use of a rubbing roll;

a step of subsequently peeling off the resist from the second substrate;

a step of forming a sealing member on the first substrate so as to encircle the first circular transparent electrode;

a step of scattering gap members in a region encircled by the sealing member on the first substrate;

a step of bonding the first substrate with the second substrate so as to overlap each other with the gap members interposed therebetween by opposing the first circular transparent electrode to the second circular transparent electrode such that respective centers thereof coincide with each other, and the respective first directions in which the alignment treatment is applied to the respective alignment layers coincide with each other; and a step of filling twisted nematic liquid crystal in a spacing encircled by the sealing member, and between the first substrate and the second substrate.

2. A method of fabricating a super-resolution optical panel according to claim 1, wherein, in the step of forming the first circular transparent electrode on the first substrate, a first take-out electrode for connecting the first circular transparent electrode to an external terminal, and an isolated second take-out electrode are formed on the first substrate, in the step of forming the second circular transparent electrode on the second substrate, a third take-out electrode for connecting the second circular transparent electrode to the second take-out electrode is formed on the second substrate, and said method further comprising a step of installing an electrically conductive adhesive on the third take-out electrode formed on the second substrate, subsequently to the step of scattering gap members, wherein the second take-out electrode and the third take-out electrode are connected with each other by the electrically conductive adhesive in the step of bonding the first substrate with the second substrate so as to overlap each other.

3. A method of fabricating a super-resolution optical panel according to claim 2, wherein, in the step of forming the first circular transparent electrode on the first substrate, a central circular transparent electrode in a small circular shape, and a ring-like transparent electrode provided with a narrow annular gap interposed between the outside of the central circular transparent electrode and the ring-like transparent electrode are formed on the first substrate as the first circular transparent electrode while a fourth take-out electrode and a first take-out electrode for connecting the central circular transparent electrode in the small circular shape and the ring-like transparent electrode to external terminals, respectively, together with an isolated second take-out electrode are formed.

4. A method of fabricating a super-resolution optical panel according to claim 1, wherein, in the step of forming the first circular transparent electrode on the first substrate, a first take-out electrode for connecting the first circular transparent electrode to an external terminal, and an isolated second take-out electrode are formed on the first substrate, in the step of forming the second circular transparent electrode on the second substrate, a third take-out electrode for connecting the second circular transparent electrode to the second take-out electrode is formed on the second substrate, in the step of forming the sealing member on the first substrate, an anisotropic electrically conductive sealing member is formed so as to encircle the first circular transparent electrode and pass on the second take-out electrode, and in the step of bonding the first substrate with the second substrate so as to overlap each other, the second take-out electrode and the third take-out electrode are connected with each other by the anisotropic electrically conductive sealing member.

5. A method of fabricating a super-resolution optical panel according to claim 4, wherein, in the step of forming the first circular transparent electrode on the first substrate, a central circular transparent electrode in a small circular shape, and a ring-like transparent electrode provided with a narrow annular gap interposed between the outside of the central circular transparent electrode and the ring-like transparent electrode are formed on the first substrate as the first circular transparent electrode while a fourth take-out electrode and a first take-out electrode for connecting the central circular transparent electrode in the small circular shape and the ring-like transparent electrode to external terminals, respectively, together with an isolated second take-out electrode are formed.

6. A method of fabricating a super-resolution optical panel according to claim 1, wherein, in the step of forming the first circular transparent electrode on the first substrate, a central circular transparent electrode in a small circular shape, and a ring-like transparent electrode provided with a narrow annular gap interposed between the outside of the central circular transparent electrode and the ring-like transparent electrode are formed on the first substrate as the first circular transparent electrode.

7. A method of fabricating a super-resolution optical panel according to claim 1, wherein the step of forming the resist patterned in the doughnut-like shape provided with the opening in the circular shape at the center thereof, on the alignment layer of the second substrate with the rubbing treatment applied thereto, comprises the steps of:

applying a positive photosensitive resist onto the alignment layer of the second substrate with the rubbing treatment applied thereto;

subjecting the positive photosensitive resist to exposure by use of a photo mask having a through-hole in a circular shape at a center thereof;

subsequently developing the positive photosensitive resist by immersing the second substrate in a developing solution and dissolving a circular portion at a center of the positive photosensitive resist, exposed to light, and forming a resist patterned in a doughnut-like shape by baking and curing a remaining portion of the positive photosensitive resist, in a doughnut-like shape.

8. A method of fabricating a super-resolution optical panel according to claim 1, wherein a multiple pieces of the super-resolution optical panels are fabricated at a time with the use of a pair of the first substrate and the second substrate, both being transparent, in the step of forming the sealing member on the first substrate so as to encircle the first circular transparent electrode, a first sealing member having a filling hole is formed in such a way as to encircle a first circular transparent electrode of individual super-resolution optical panels while a second sealing member having a filling hole is formed in such a way as to enclose an entire region where all the super-resolution optical panels are formed, in the step of filling the twisted nematic liquid crystal in the spacing encircled by the sealing member, and between the first substrate and the second substrate, the twisted nematic liquid crystal is filled into the spacing encircled by the respective first sealing members of all the super-resolution optical panels through the filling hole of the respective first sealing members by filling the twisted nematic liquid crystal through the filling hole of the second sealing member, and said method further comprising a step of subsequently cutting the first substrate and the second substrate into a size of the individual super-resolution optical panels, respectively, and closing the filling hole of the first sealing member of the respective super-resolution optical panels as cut, with an adhesive.

9. A method of fabricating a super-resolution optical panel according to claim 7, wherein a multiple pieces of the super-resolution optical panels are fabricated at a time with the use of a pair of the first substrate and the second substrate, both being transparent, in the step of forming the sealing member on the first substrate so as to encircle the first circular transparent electrode, a first sealing member having a filling hole is formed in such a way as to encircle a first circular transparent electrode of individual super-resolution optical panels while a second sealing member having a filling hole is formed in such a way as to enclose an entire region where all the super-resolution optical panels are formed, in the step of filling the twisted nematic liquid crystal in the spacing encircled by the sealing member, and between the first substrate and the second substrate, the twisted nematic liquid crystal is filled into the spacing encircled by the respective first sealing members of all the super-resolution optical panels through the filling hole of the respective first sealing members by filling the twisted nematic liquid crystal through the filling hole of the second sealing member, and said method further comprising a step of subsequently cutting the first substrate and the second substrate into a size of the individual super-resolution optical panels, respectively, and closing the filling hole of the first sealing member of the respective super-resolution optical panels as cut, with an adhesive.

* * * * *